(12) United States Patent
Kosmowski (10) Patent No.: US 7,547,168 B1
(45) Date of Patent: Jun. 16, 2009

(54) HIGH SPEED SPINDLE SYSTEM AND CENTRIFUGAL CHUCK

(76) Inventor: Wojciech B. Kosmowski, 26392 Calle Roberto, San Juan Capistrano, CA (US) 92675

( * ) Notice: Subject to any disclaimer, the term of this patent is extended or adjusted under 35 U.S.C. 154(b) by 0 days.

(21) Appl. No.: 12/105,229

(22) Filed: Apr. 17, 2008

(51) Int. Cl.
B23C 1/00 (2006.01)
B23Q 5/04 (2006.01)

(52) U.S. Cl. .................. 409/231; 279/131; 384/107; 310/156.11

(58) Field of Classification Search .......... 409/231, 409/232, 233; 408/239 R, 239 A, 124, 129; 279/129, 131; 310/156.11; 384/107
See application file for complete search history.

(56) References Cited

U.S. PATENT DOCUMENTS

| | | | |
|---|---|---|---|
| 3,795,455 A * | 3/1974 | Kosmowski | 408/239 R |
| 4,869,626 A * | 9/1989 | Kosmowski | 408/129 |
| 5,674,032 A * | 10/1997 | Slocum et al. | 409/231 |
| 5,921,731 A * | 7/1999 | Chandrasekar | 409/231 |
| 5,997,223 A | 12/1999 | Kosmowski | |
| 6,089,799 A * | 7/2000 | Momochi et al. | 409/132 |
| 6,443,462 B2 | 9/2002 | Tempest | |
| 6,585,462 B1* | 7/2003 | Goransson | 409/231 |
| 7,125,208 B2* | 10/2006 | Schweizer et al. | 409/136 |
| 2004/0149110 A1* | 8/2004 | Kubota | 83/663 |

FOREIGN PATENT DOCUMENTS

JP 57-163031 A * 10/1982

OTHER PUBLICATIONS

Definition of "rare earth element" from " Merriam Webster's Online Dictionary", dated 1924, printed Mar. 31, 2009.*

* cited by examiner

Primary Examiner—Erica E Cadugan
(74) Attorney, Agent, or Firm—Larry K. Roberts (57) ABSTRACT

An exemplary embodiment of a high speed spindle for rotating a tool at high rotational rates includes a hollow spindle body and a cylindrical spindle shaft configured for rotation within the spindle body and having a front end and a rear end. The spindle shaft includes a front hollow region and a rear hollow region. A motor is configured to impart rotational drive forces to the spindle shaft during operation. The spindle shaft includes a thrust bearing flange disposed intermediate the front end and the back end of the spindle shaft. A front air bearing and a rear air bearing are configured to radially support the spindle shaft for high speed rotational movement. A thrust air bearing is disposed between the front air bearing and the rear air bearing within the spindle housing and configured to act on the thrust bearing flange of the spindle shaft to constrain axial movement of the spindle shaft within the spindle housing. A collet is disposed within the front hollow region of the spindle shaft. An exemplary embodiment of a collet involves a centrifugal collet of unitary sleeve structure and having a plurality of flexures and weights.

29 Claims, 6 Drawing Sheets

HIGH SPEED SPINDLE SYSTEM AND CENTRIFUGAL CHUCK

BACKGROUND

There are two types of spindles on the market, i.e. conventional and reciprocating spindles. Conventional spindles cover a wide range of revolutions per minute (RPM) up to 300,000 RPM, and provide only rotation to the drill bit, not a feeding motion into the work piece, which is provided by a system to move the spindle. These spindles are typically relatively heavy, e.g., weighing between 4 and 7 kilograms, and require considerable energy to accelerate and decelerate in a feeding movement. The present trend towards small drill bit diameters demands good machine stability which is very difficult to obtain with high weight spindles. Reaction forces from accelerating and decelerating a heavy spindle generate vibrations on the machine which are detrimental to small-hole drilling.

Reciprocating spindles provide both rotation to the drill bit as well as a feeding motion. The reciprocating spindle typically has a very low moving mass since only the shaft and driving coil are moving, e.g., in the neighborhood of 0.45 kilograms. This is well suited for small-hole drilling because it generates very small forces during drilling; however it has drawbacks. One is that the stroke of the spindle is limited in contrast to the conventional spindle where it can be as large as required. Secondly it is difficult to run high RPMs with any practical stroke.

The majority of PCB drilling machines use spindles with air actuated spring loaded tapered collets. This solution is very complex, contains 20 to 35 parts, and is difficult to balance, expensive to manufacture and hard to maintain low run-out. In addition the taper collet configuration is affected by centrifugal force which causes it to reduce the grip on the drill bit as RPMs increase.

There are many existing centrifugal collets. Examples of collets are disclosed in U.S. Pat. No. 6,443,462B2, and U.S. Pat. No. 5,997,223.

DETAILED DESCRIPTION

In the following detailed description and in the several figures of the drawing, like elements are identified with like reference numerals. The figures may not be to scale, and relative feature sizes may be exaggerated for illustrative purposes.

An exemplary embodiment of a spindle is miniaturized, to reduce the weight and to facilitate use of non-exotic materials for the non-magnetic spindle shaft. Suitable materials for the spindle shaft which are non-magnetic materials, for the case in which the spindle shaft is driven by a permanent magnet DC motor, include non-magnetic steel or an INCONEL.® Other materials which could be used for the shaft are ceramics, as described in U.S. Pat. No. 5,997,223, and beryllium, although these materials may be more expensive and have other drawbacks. By decreasing the shaft diameter from larger diameters typically used for conventional spindle shafts, to smaller diameters, such as 10 mm, for example, standard materials may be used for the spindle shaft. The air bearing configuration of this exemplary embodiment provides improved load distribution by locating thrust bearings together with the motor in between radial air bearings, instead of locating a thrust bearing on the back of the spindle. This reduces the cantilever effect. The cantilever effect may be further reduced by eliminating a protrusion of the spindle shaft from the spindle body.

In an exemplary embodiment, a front radial air bearing is combined with a thrust bearing, and can be assembled with the shaft and tested as a unit and later inserted into the spindle body for final assembly. In an exemplary embodiment, the spindle may be configured in such a way that wires from the motor rotating the spindle are brought out directly through the rear radial bearing without any need of manipulating them by winding them through the body of the spindle. This simplifies the assembly greatly and decreases the cost of building spindles.

An exemplary embodiment of a spindle utilizes a permanent magnet DC motor, with a permanent magnet mounted in a bore of the spindle shaft. An advantage of this approach is that centrifugal forces of the rotor are dissipated by the spindle shaft in contrast to other designs where the rotor is attached to the outer diameter of the spindle shaft and special devices need to be employed to retain centrifugal forces during high RPM operation. Another advantage of a DC permanent magnet motor is that the motor RPM can be derived from the internal motor windings, without the need of a special RPM sensor. Alternatively, the spindle shaft may be driven by an AC motor, or by other drive systems, such as a pneumatic system.

Figures 1, 2:
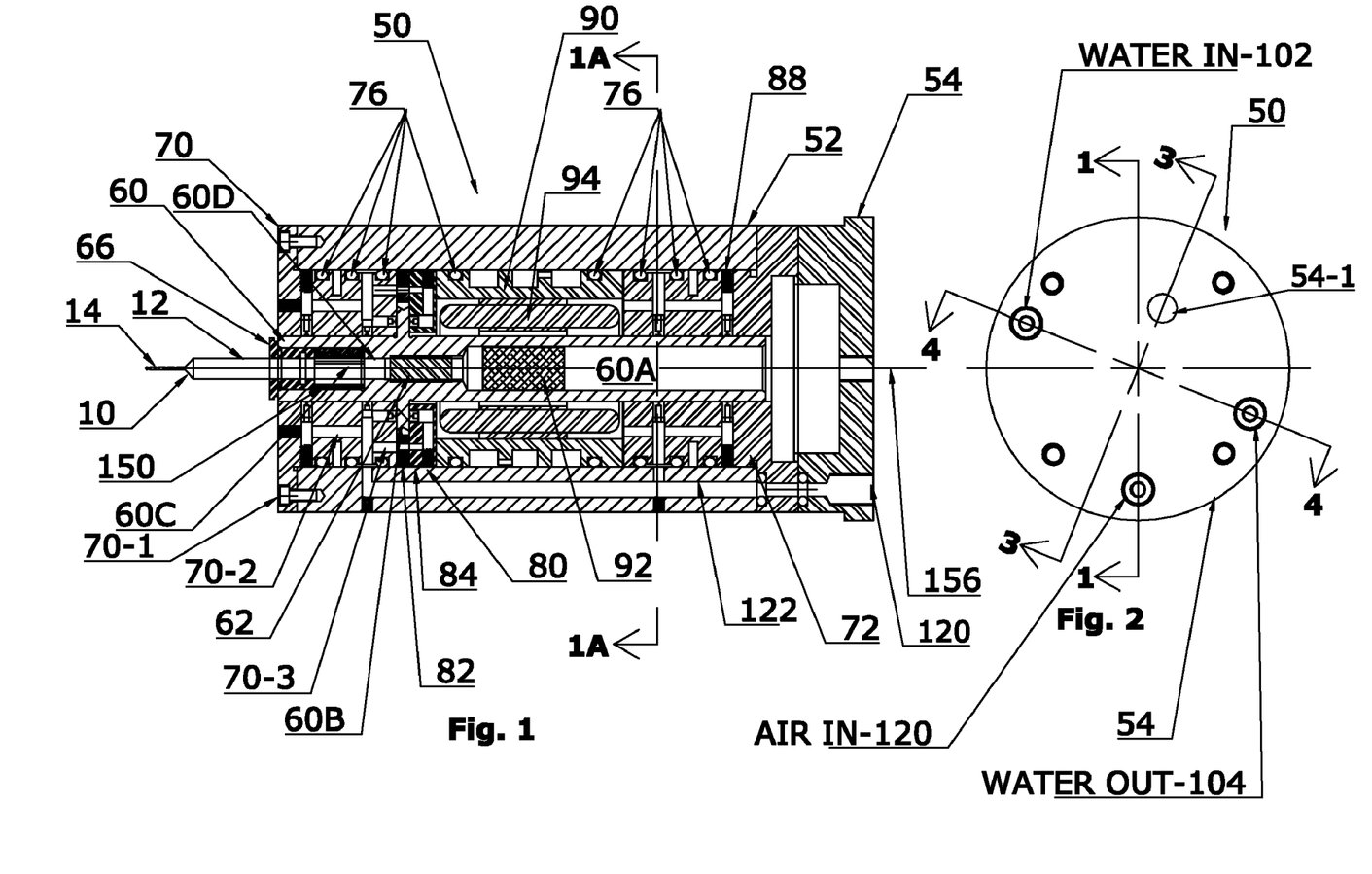
FIG. 1 is a cross-sectional view, taken along line 1-1 of FIG. 2, of an exemplary embodiment of a spindle assembly.
FIG. 2 is an end view of the spindle of FIG. 1.
Figure 1A:
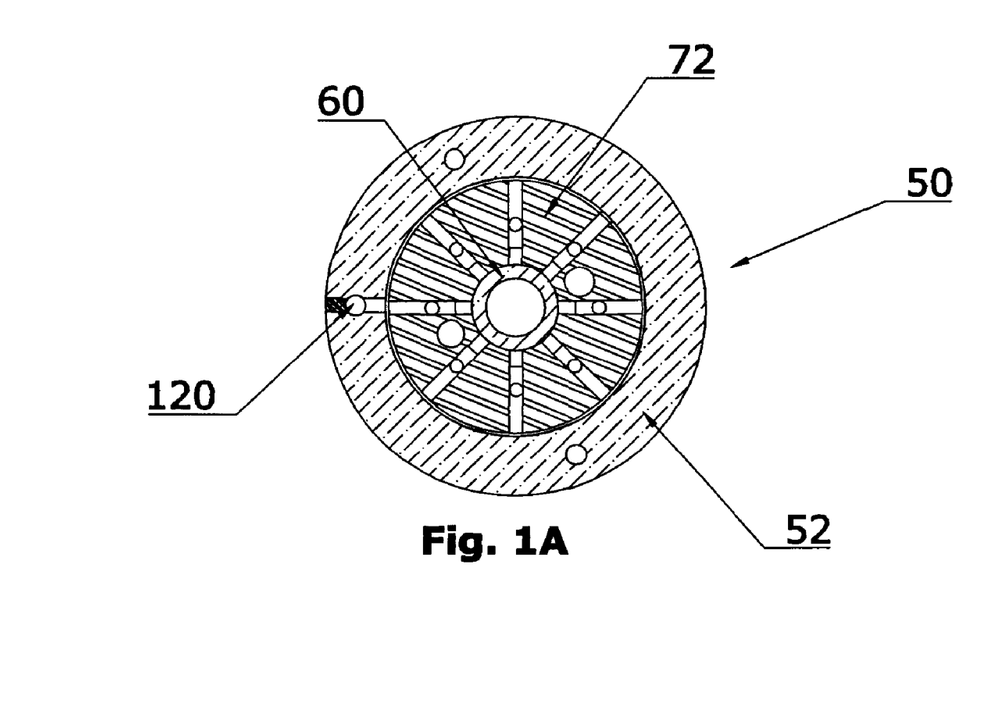
FIG. 1A is a cross-sectional end view taken along line 1A-1A of FIG. 1.
Figure 3:
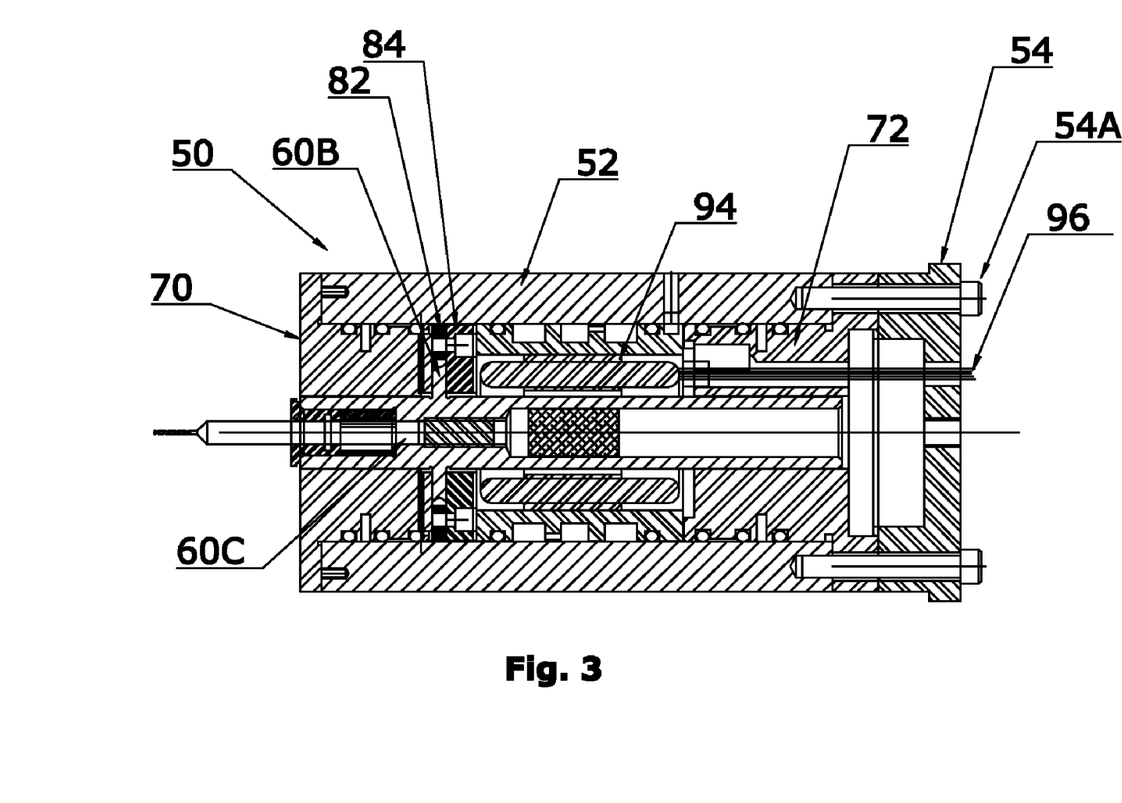
FIG. 3 is a cross-sectional view, taken along line 3-3 of FIG. 2, of the exemplary embodiment of the spindle assembly of FIG. 1.
Figure 4:
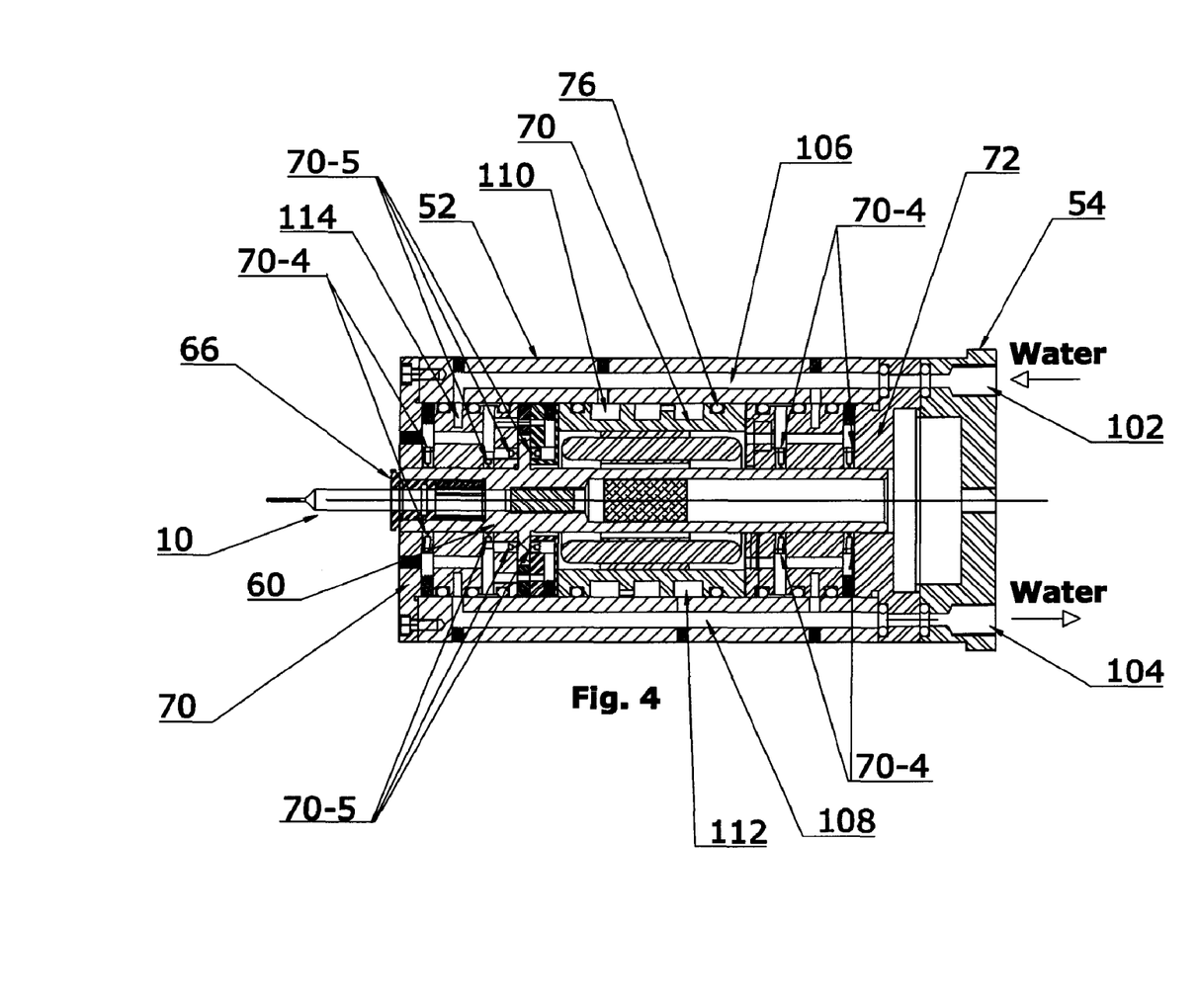
FIG. 4 is a cross-sectional view, taken along line 4-4 of FIG. 2, of the exemplary embodiment of the spindle assembly of FIG. 1.

Turning now to FIGS. 1-4, an exemplary embodiment of a spindle 50 is illustrated. FIGS. 1 and 3-4 are longitudinal cross-sections of the spindle 50, showing features of the spindle. The spindle includes a hollow outer spindle body 52, a rear end cap 54, a front air bearing 70 and a rear air bearing 72. A spindle shaft 60 is mounted for rotation in the spindle body.

The spindle shaft 60 has a rear interior bore 60A; the permanent magnet 92 of the DC motor is mounted in the middle of the bore, e.g. by cementing it in place. In an exemplary embodiment, the magnet is a rare earth magnet. Exemplary dimensions of the magnet include an outer diameter 6.5 mm and a length of 12.5 mm. It is noted that rare earth magnet DC brushless motors are generally known in the art, as well as techniques for driving the motors.

On the front end of the spindle shaft 60, a drill bit depth adjustment screw 62 is installed between the rear bore 60A and a front bore 60C. In the front bore 60C of the spindle shaft, a centrifugal collet 150 is installed and secured by a shaft cap 66 which is inserted into the end of the front bore 60C, i.e. at the spindle nose. The shaft cap 66 may be fabricated of a material such as tool steel, and may be used also for balancing the front of the rotor. Adjustments in the dimensions of the bore 60A at the rear of the spindle shaft may be used to balance the other end of the shaft; e.g., material can be removed from the bore 60A to balance the rear end of the shaft. Material can be removed from the outer surface of the center of the spindle shaft to balance the middle of the shaft. By doing this, three plane balancing may be achieved.

A function of the shaft cap 66 is to guide the tool 10, e.g. a drill bit or router tool having a tool shank 12 and a working end 14, being inserted during a tool changing operation by a tool changer into the collet 150 without damaging it and center the drill shank 12 in respect to the spindle bore. In an exemplary embodiment, the shaft cap 66 has a push-fit into the front bore 60C of the spindle shaft and is secured in place with an adhesive.

The spindle shaft 60 is supported for rotation within the spindle body 52 by front and rear radial air bearings 70 and 72. The rear air bearing 72 provides a hole 54-1 (FIG. 2) for the spindle motor wire 96 passage from motor stator windings 94 to a motor drive circuit (not shown). The air bearings are mounted in the outer spindle housing 52, and air and water passages are sealed and separated by O-rings 76. The air inlet port 120 (FIGS. 1 and 2) for the air bearings is connected to a source of pressurized air (not shown).

A rear thrust bearing structure 84 of the thrust bearing 80 works in conjunction with a thrust bearing flange 60B on the spindle shaft 60. The working gap of the thrust bearing is established by a thrust bearing spacer 82. The radial bearings and thrust bearings include orifices 70-4 and 70-5 for air distribution. Brass plugs 88 are used to close excess holes to create proper air and water distribution. The front air bearing 70 is secured to the face of the spindle housing 54 by four screws 70-1.

Exemplary length and diameter dimensions for the spindle shaft for an exemplary embodiment are 75 mm in length and 10 mm in diameter, a thrust bearing flange outer diameter of 19 mm, diameter, and a flange thickness of 1.9 mm. In an exemplary embodiment, the thrust bearing flange is located intermediate the front and rear ends of the shaft, in close proximity to the center of gravity of the spindle shaft.

In between the front and rear air bearings 70 and 72, a stator and cooling jacket assembly 90 for the permanent magnet DC motor is mounted inside the outer housing 52. O-rings 76 seal the water passages 106, 108, 110, 114 (FIG. 4). Water distribution is built into the spindle housing through the holes 106, 108 (see FIG. 4) drilled longitudinally along the wall of housing 52 and enter and exit through holes 102, 104 (see FIGS. 2 and 4) in the rear radial bearing 72 and end cap 54. Air distribution is built into the spindle housing through the hole 122 (see FIG. 1) drilled longitudinally along the wall of housing 52, with pressurized air entering through hole 120 (see FIGS. 1 and 2) in the rear radial bearing 72 and end cap 54, and being exhausted to the atmosphere through the air bearings. The passages are sealed by O-rings 76. The end cap 54 houses the air and water fittings and also has an opening 54-1 (FIG. 2) for bringing motor wires 96 outside the spindle from the stator coils 94. The end cap is secured to the spindle housing by screws 54A through the flange of the rear air bearing.

In an exemplary embodiment, the air bearings 70, 72 and the cooling jacket assembly 90 are fabricated of bronze, and the spindle outer housing 52 is fabricated of stainless steel. Other materials suitable for the purpose may alternatively be employed. The inner diameters of the air bearings and cooling jacket are sized in conjunction with the outer diameter of the spindle shaft to provide working clearances.

Collet

Figures 5, 7:
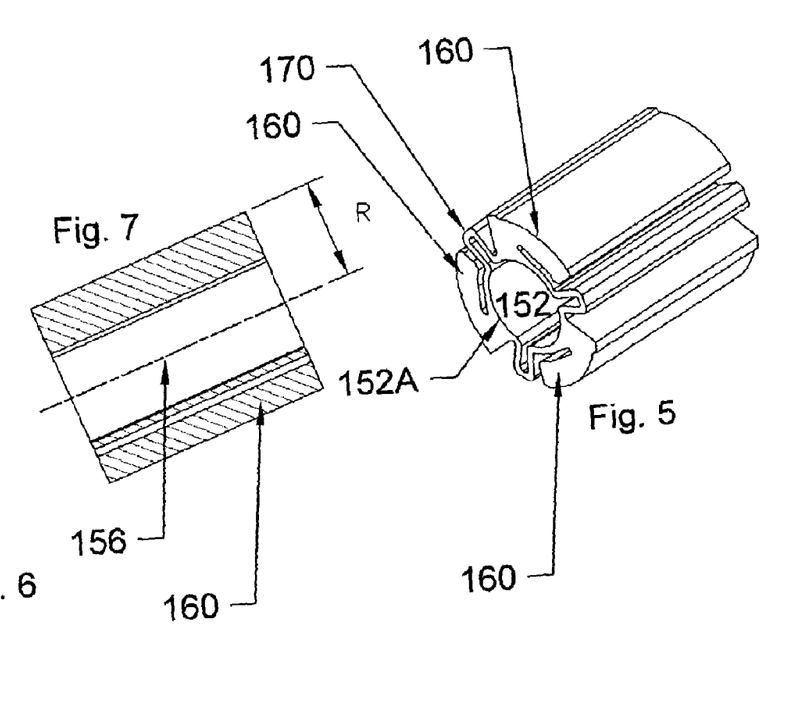
FIG. 5 is an isometric view of a centrifugal chuck.
FIG. 7 is a cross-sectional view of the chuck of FIG. 5, taken along line 7-7 of FIG. 6.
Figure 6:
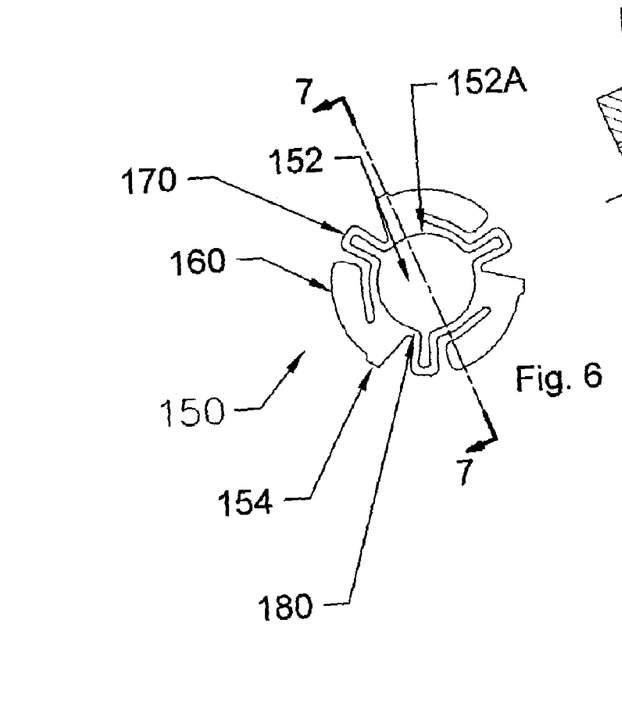
FIG. 6 is an end view of the chuck of FIG. 5.

An exemplary embodiment of a collet 150 is illustrated in FIGS. 5-7. This embodiment may be manufactured separately by an electrical discharge machining (EDM) process, and all accuracy pertaining to run-out may be built into the collet before installing it into the spindle nose. The collet features are defined in a sleeve structure, fabricated from a cylindrical blank, which is inserted into the spindle nose, i.e. in the bore at the spindle shaft front end. The collet 150 has a plurality of flexures 170 defined by cut-outs of the sleeve blank from the inside diameter (ID) surface and the outside diameter (OD) surface of the sleeve, creating conditions which allow the flexures 170 to expand and allow the weights 160 to move outward during rotation. The maximum clamping force is controlled by the flexure and weight geometry when the moving weights of the collet reach the ID surface of the spindle shaft and cannot expand anymore. In addition the installation of the collet is facilitated because the weights can collapse with the flexures to conform to the ID surface of the spindle shaft front end during installation.

An exemplary embodiment of the blank of the collet sleeve is made from tool steel which has been heat treated and tempered. After the heat treatment, the outer surface of the collet sleeve blank is ground to a precise diameter and the interior bore defining an ID surface 152A is ground and honed to ensure proper size and concentricity. This sleeve with its accurately determined ID and OD provide the finished accuracy of the collet. After the heat treatment and grind and hone operations, the EDM process may be carried out.

The geometry of the collet 150, in an exemplary embodiment, has three weights 160 spaced symmetrically around the rotating axis of the spindle; the axis is indicated as 156 in FIG. 7. The weights are connected by flexures 170 which are defined by material removed from the sleeve blank by an EDM fabrication process. During the EDM process, in an exemplary embodiment, the OD and ID of the sleeve blank are not modified to maintain the integrity and symmetry of the collet. The weights and flexures are defined during the EDM process by material removed from the sleeve blank to provide the functionality of the collet.

An exemplary embodiment of the collet may have the characteristic that the drill bit or tool 10 may be held in the spindle shaft end, i.e. the nose of the spindle, without the need of providing a special O-ring to hold the drill bit in place before rotating the spindle. The geometry of the weights and flexures may be designed in such a fashion that the weights expand in the bore of the spindle nose and clamps the drill bit shank at the same time. In an exemplary embodiment, the OD of the tool shank is larger than the ID of the collet. The collet retains the shaft of the tool at zero RPM, even without the use of an O-ring. With material removed both from the inner surface as well as the outer surface of the sleeve blank to fabricate the collet, the inner surfaces of the collet will be deflected outwardly as the tool shank is inserted into the collet, thus providing a clamping force on the tool shank. The clamping force increases with RPM; therefore the strongest clamping is on the highest RPM, until the weights move outwardly enough to contact the interior surface of the spindle shaft in which the collet is installed.

Figure 8:
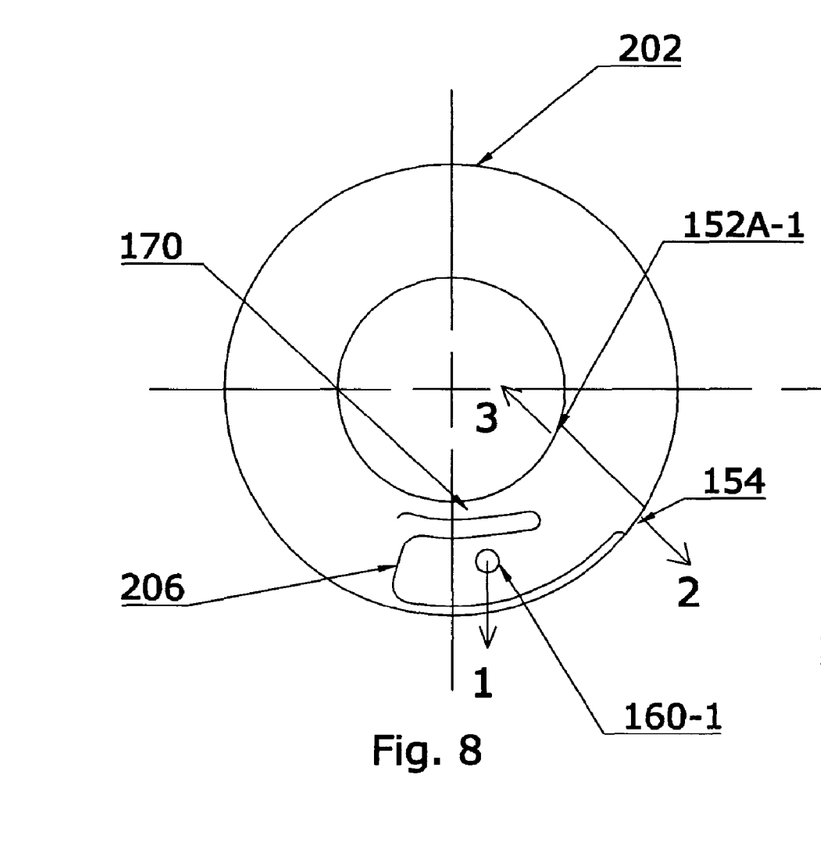
FIGS. 8 and 9 are diagrammatic views conceptually illustrating motion of collet weights and clamping forces exerted by an exemplary collet weight and flexure of an exemplary embodiment of a collet.
Figure 9:
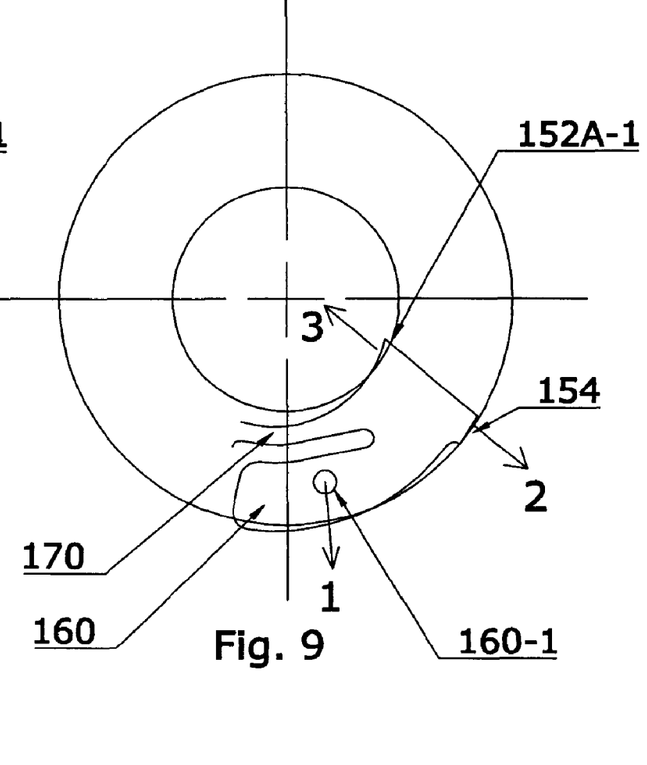

The geometry of the weights 160 is designed in such a way that the clamping force is multiplied by leverage. The leverage is illustrated in FIGS. 8 and 9. Here, circles 202 and 204 represents the outer and inner surfaces of the sleeve blank from which the collet is to be fabricated. Line 206 represents a line along which material is removed by the fabrication process, e.g. by an EDM process, defining a single weight 160 and a flexure 170. FIG. 8 represents the collet at rest, and FIG. 9 represents the collet in rotational motion; FIG. 9 is exaggerated to visibly illustrate deflections. The center of gravity of the weight 160 is shown at 160-1. As the collet is rotated, the center of gravity of the weight will move outwardly, as depicted conceptually in FIG. 9. The point 154 on the outer surface of the collet acts as a response point, and is typically in contact with the inner surface of the bore in the spindle shaft. The motion of the weight 160 outwardly tends to cause region 152A-1 to be deflected inwardly, thus applying a clamping force on the tool shank. The leverage results from the distance of the center of gravity from the response point 154. The thickness of the flexures 170 controls the stiffness of the device and the shape of the weights 160 control the clamping force. By varying these two parameters, the collet can be designed to clamp on lower RPMs or on higher RPMs. The clamping forces are exerted along longitudinally extending lines or surfaces 152A (FIGS. 5 and 6) which extend along the entire longitudinal length of the collet, not just on points or small areas of the tool shank, and this contributes to reduction in runout errors.

In an exemplary embodiment, the collet 150 is mounted inside the front bore 60C of the spindle shaft 60, and a shaft cap 66 is installed at the front of the spindle shaft bore to protect the collet during insertion of drill bit by the tool changer. On the back of the collet in the spindle shaft there is a precise bore 60D to accept the drill bit shank 12 after it passes the full collet length. On the back of the bore to accept the drill bit shank there is an adjustable stop screw 62 to establish the proper protrusion of the drill bit point from the spindle shaft end. The shaft cap 66 is also used for final balancing purposes; material can be removed from its face for final balancing.

An exemplary embodiment of the collet 150 may be field exchangeable, i.e. replaceable, in the spindle 50, by first removing the cap 66, and withdrawing the collet 150 from the bore in the shaft. Another collet may be assembled to the spindle by reversing the procedure. The collet is assembled into the spindle shaft with a slip interference fit; post assembly grinding or machining is not performed. In an exemplary embodiment, the collet is small and of relatively small mass, and so replacement of the collet with another collet will not appreciably affect the balance. An exemplary collet embodiment may have OD and ID dimensions of 6.35 mm and 3.175 mm, respectively, and a length of 7.6 mm, with a total mass of 1.41 grams. Of course, other embodiments of a collet may have different dimensions and mass characteristics.

Benefits of exemplary embodiments of the spindle architecture may include one or more of the following: very low weight, high RPM, low weight and small size, economical to manufacture, single part centrifugal collet, small size centrifugal collet to minimize centrifugal forces, run-out control built into collet—not machined on assembly, replaceable collet, large Z-axis stroke to accommodate all drilling machine functions, minimization of shock waves on drilling machine during Z operation, and very low run-outs on drill bits. An exemplary embodiment of the spindle is configured for high speed use, e.g., at least 400,000 RPM, and may have a weight of 1000 grams, e.g. about 930 grams in one exemplary embodiment. Exemplary applications for the spindle include drilling and micromachining in the printed circuit board industry.

Although the foregoing has been a description and illustration of specific embodiments of the subject matter, various modifications and changes thereto can be made by persons skilled in the art without departing from the scope and spirit of the invention as defined by the following claims.

What is claimed is:

1. A high speed spindle assembly for rotating a tool at high rotational rates, comprising:
   a hollow spindle housing;
   a spindle shaft configured for rotation within the spindle housing and having a front end and a rear end, the spindle shaft including a front hollow region and a rear hollow region;
   a motor configured to impart rotational drive forces to the spindle shaft during operation;
   the spindle shaft including a thrust bearing flange disposed intermediate the front end and the rear end of the spindle shaft and protruding from a peripheral surface of the shaft;
   a front air bearing and a rear air bearing configured to radially support the spindle shaft for high speed rotational movement;
   a thrust air bearing disposed between the front air bearing and the rear air bearing within the spindle housing and configured to act on the thrust bearing flange of the spindle shaft to constrain axial movement of the spindle shaft within the spindle housing, wherein the thrust bearing includes a rear thrust bearing structure to the rear of the thrust bearing flange, which rear thrust bearing structure is fastened to the front air bearing such that the front air bearing, the spindle shaft, and the thrust bearing are able to be inserted together into the hollow spindle housing;
   a collet disposed within the front hollow region of the spindle shaft.

2. The spindle assembly of claim 1, further comprising:
   a system of coolant passages within the spindle housing and connected between an input port and an output port, said system of coolant passages configured to allow a coolant fluid passing through the coolant passages to cool the spindle assembly.

3. The spindle assembly of claim 1, wherein the front end of the spindle shaft does not protrude from a front face of the spindle housing.

4. The spindle assembly of claim 1, wherein the spindle shaft has a length dimension between the front end and the rear end which does not exceed 75 mm.

5. The spindle assembly of claim 4, wherein the spindle shaft has an outer diameter of 10 mm.

6. The spindle assembly of claim 4, wherein the motor is a DC electric motor, including a permanent magnet fixedly mounted within the rear hollow region of the spindle shaft and configured to rotate with the spindle shaft during operation, and a winding set mounted within the spindle housing, and said shaft is fabricated of a non-magnetic material.

7. The spindle assembly of claim 6, wherein the motor is configured to drive the spindle shaft at rotational rates at least as high as 400,000 RPM.

8. The spindle assembly of claim 1, further comprising a hollow cap structure positioned in the front hollow region of the spindle shaft outwardly of the collet.

9. The spindle assembly of claim 1, wherein the collet is configured for field replacement in the spindle shaft.

10. The spindle assembly of claim 1, wherein the motor is an electric motor including a stator winding set, connected by wiring to an external motor drive, and wherein the wiring is passed directly through a rear end cap without winding through the spindle housing.

11. The spindle assembly of claim 1, wherein the thrust bearing flange is located in close proximity to a center of gravity of the spindle shaft.

12. The spindle assembly of claim 1, wherein the total mass of said assembly is less than 1000 grams.

13. The assembly of claim 1, wherein said collet is configured for mounting a tool having a tool shank and a tool working portion attached to the shank to the spindle shaft, said collet comprising:
a unitary sleeve structure integrally formed from a single piece of material having an inner diameter and an outer diameter, the sleeve structure including an interior open region for receiving the tool shank, including a plurality of flexures holding in place a plurality of weights which during spinning generate a clamping force between a bore in a spindle nose and the tool shank, the flexures and weights defined by a first set of relieved areas in the sleeve structure which extend from an outer circumference inwardly, and by a second set of relieved areas in the sleeve structure which extend from said interior open region outwardly.

14. The assembly of claim 13, wherein the interior region is defined by a plurality of interior circumferential surface portions connected by said plurality of flexures, and wherein said plurality of weights tend to move outwardly when the collet is rotated at high speed and pivot about respective pivot areas, causing a clamp region of said plurality of interior circumferential surface portions to move inwardly to apply said clamping forces on said tool shank.

15. The assembly of claim 14, wherein said clamp regions are longitudinally extending surface portions which extend along an entire longitudinal length of the collet.

16. The assembly claim 13, wherein the material of the collet is a tool steel.

17. The assembly of claim 13, wherein the plurality of weights consists of three weights and the plurality of flexures consists of three flexures.

18. The assembly of claim 13, wherein the tool shank has a nominal outer diameter, and the inner diameter of the sleeve structure is smaller than said nominal outer diameter, and wherein the collet when installed in the mounting region of the spindle shaft applies a clamp force on the tool shank in a stationary rest condition.

19. The assembly of claim 13, wherein the collet is configured to be field replaceable within the front hollow region of the spindle shaft.

20. The assembly of claim 13, wherein the collet is configured to be assembled into the front hollow region of the spindle shaft with a slip interference fit.

21. A high speed spindle system for rotating a tool at high rotational rates, comprising:
a hollow spindle housing;
a cylindrical spindle shaft configured for rotation within the spindle housing and having a front end and a rear end, the spindle shaft including a front hollow region and a rear hollow region, the shaft fabricated of a non-magnetic material;
a DC electrical motor configured to impart rotational drive forces to the spindle shaft during operation, the electrical motor including a permanent magnet fixedly mounted within the rear hollow region of the spindle shaft and configured to rotate with the spindle shaft during operation, and a winding set mounted within the spindle housing;
the spindle shaft including a thrust bearing flange disposed intermediate the front end and the rear end of the spindle shaft and protruding from a peripheral surface of the shaft;
a front air bearing and a rear air bearing configured to radially support the spindle shaft for high speed rotational movement;
a thrust air bearing disposed between the front air bearing and the rear air bearing within the spindle housing and configured to act on the thrust bearing flange of the spindle shaft to constrain axial movement of the spindle shaft within the spindle housing, wherein the thrust bearing includes a rear thrust bearing structure to the rear of the thrust bearing flange, which rear thrust bearing structure is fastened to the front air bearing such that the front air bearing, the spindle shaft, and the thrust bearing are able to be inserted together into the hollow spindle housing;
a collet disposed within the front hollow region of the spindle shaft.

22. The spindle system of claim 21, further comprising:
a system of coolant passages within the spindle housing and connected between an input port and an output port, said system of coolant passages configured to allow a coolant fluid passing through the coolant passages to cool the spindle system.

23. The spindle system of claim 21, wherein the permanent magnet is a rare earth magnet.

24. The spindle system of claim 21, wherein the front end of the spindle shaft does not protrude from a front face of the spindle housing.

25. The spindle system of claim 21, wherein the spindle shaft has a length dimension between the front end and the rear end which does not exceed 75 mm.

26. The spindle system of claim 21, further comprising a hollow cap structure positioned in the front hollow region of the spindle shaft outwardly of the collet.

27. The spindle system of claim 21, wherein the spindle housing includes therein the front air bearing, the rear air bearing, a cooling structure intermediate the front air bearing and the rear air bearing inside the housing, wherein a rear end cap is affixed to the spindle housing, and wherein the DC electric motor includes a stator winding set and a wiring set passed from the stator winding set to outside the spindle housing, and wherein the wiring set is passed directly through the rear end cap without winding through the spindle housing.

28. A high speed spindle assembly for rotating a tool at high rotational rates, comprising:
a hollow spindle housing;
a spindle shaft configured for rotation within the spindle housing and having a front end and a rear end, the spindle shaft including a front hollow region and a rear hollow region, and wherein the front end of the spindle shaft does not protrude from a front face of the spindle housing;
a motor configured to impart rotational drive forces to the spindle shaft during operation;
the spindle shaft including a thrust bearing flange disposed intermediate the front end and the rear end of the spindle shaft and protruding from a peripheral surface of the shaft;
a front air bearing and a rear air bearing configured to radially support the spindle shaft for high speed rotational movement;
a thrust air bearing disposed between the front air bearing and the rear air bearing within the spindle housing and configured to act on the thrust bearing flange of the spindle shaft to constrain axial movement of the spindle shaft within the spindle housing;
a collet disposed within the front hollow region of the spindle shaft.

29. A high speed spindle system for rotating a tool at high rotational rates, comprising:

a hollow spindle housing;

a cylindrical spindle shaft configured for rotation within the spindle housing and having a front end and a rear end, the spindle shaft including a front hollow region and a rear hollow region, the shaft fabricated of a non-magnetic material, and wherein the front end of the spindle shaft does not protrude from a front face of the spindle housing;

a DC electrical motor configured to impart rotational drive forces to the spindle shaft during operation, the electrical motor including a permanent magnet fixedly mounted within the rear hollow region of the spindle shaft and configured to rotate with the spindle shaft during operation, and a winding set mounted within the spindle housing;

the spindle shaft including a thrust bearing flange disposed intermediate the front end and the rear end of the spindle shaft and protruding from a peripheral surface of the shaft;

a front air bearing and a rear air bearing configured to radially support the spindle shaft for high speed rotational movement;

a thrust air bearing disposed between the front air bearing and the rear air bearing within the spindle housing and configured to act on the thrust bearing flange of the spindle shaft to constrain axial movement of the spindle shaft within the spindle housing;

a collet disposed within the front hollow region of the spindle shaft.

* * * * *